(12) United States Patent
Sotzing

(10) Patent No.: US 9,644,313 B2
(45) Date of Patent: May 9, 2017

(54) ELECTRICALLY CONDUCTIVE SYNTHETIC FIBER AND FIBROUS SUBSTRATE, METHOD OF MAKING, AND USE THEREOF

(71) Applicant: The University of Connecticut, Farmington, CT (US)

(72) Inventor: Gregory A. Sotzing, Mansfield Center, CT (US)

(73) Assignee: THE UNIVERSITY OF CONNECTICUT, Farmington, CT (US)

( * ) Notice: Subject to any disclaimer, the term of this patent is extended or adjusted under 35 U.S.C. 154(b) by 396 days.

(21) Appl. No.: 14/317,043

(22) Filed: Jun. 27, 2014

(65) Prior Publication Data

US 2015/0017421 A1    Jan. 15, 2015

Related U.S. Application Data

(60) Provisional application No. 61/842,072, filed on Jul. 2, 2013.

(51) Int. Cl.

| | | |
|---|---|---|
| D06N 3/12 | (2006.01) | |
| D06N 3/00 | (2006.01) | |
| D06N 3/04 | (2006.01) | |
| B32B 27/12 | (2006.01) | |
| H01B 1/12 | (2006.01) | |
| D01F 6/62 | (2006.01) | |
| D01F 1/10 | (2006.01) | |
| D06M 15/19 | (2006.01) | |
| D01D 5/00 | (2006.01) | |
| D06M 101/32 | (2006.01) | |
| G02F 1/155 | (2006.01) | |

(52) U.S. Cl.
CPC .............. *D06N 3/123* (2013.01); *B32B 27/12* (2013.01); *D06M 15/19* (2013.01); *D06N 3/0036* (2013.01); *D06N 3/04* (2013.01); *H01B 1/127* (2013.01); *H01B 1/128* (2013.01); *B32B 2264/102* (2013.01); *B32B 2307/202* (2013.01); *D01D 5/0007* (2013.01); *D01F 1/10* (2013.01); *D01F 6/62* (2013.01); *D06M 2101/32* (2013.01); *D06N 2205/10* (2013.01); *D06N 2205/103* (2013.01); *D06N 2209/041* (2013.01); *D06N 2209/126* (2013.01); *D06N 2211/28* (2013.01); *G02F 1/155* (2013.01); *Y10T 428/25* (2015.01); *Y10T 428/265* (2015.01); *Y10T 428/2927* (2015.01); *Y10T 428/2949* (2015.01); *Y10T 428/2969* (2015.01); *Y10T 428/31786* (2015.04)

(58) Field of Classification Search
None
See application file for complete search history.

(56) References Cited

U.S. PATENT DOCUMENTS

| | | |
|---|---|---|
| 4,983,814 A | 1/1991 | Ohgushi et al. |
| 5,830,529 A | 11/1998 | Ross |
| 6,072,619 A | 6/2000 | Kiryuschev et al. |
| 6,103,640 A | 8/2000 | Yoshikawa et al. |
| 6,184,280 B1 | 2/2001 | Shibuta |
| 6,919,105 B2 | 7/2005 | Xue et al. |
| 7,321,012 B2 | 1/2008 | Sotzing |
| 7,413,802 B2 | 8/2008 | Karayianni et al. |
| 7,455,935 B2 | 11/2008 | Abe et al. |
| 7,740,656 B2 | 6/2010 | Mensah et al. |
| 8,107,153 B2 | 1/2012 | Sotzing et al. |
| 2001/0045547 A1 | 11/2001 | Senecal et al. |
| 2005/0137542 A1 | 6/2005 | Underhill et al. |
| 2005/0237594 A1 | 10/2005 | Ho et al. |
| 2005/0255139 A1* | 11/2005 | Hurd ...................... A01N 59/00 424/405 |
| 2006/0112599 A1 | 6/2006 | Braynock et al. |
| 2006/0159907 A1 | 7/2006 | Percec et al. |
| 2006/0263553 A1 | 11/2006 | Yamada et al. |
| 2006/0281382 A1 | 12/2006 | Karayianni et al. |
| 2007/0042179 A1 | 2/2007 | Karayianni et al. |
| 2007/0054577 A1 | 3/2007 | Avloni |
| 2007/0065586 A1* | 3/2007 | Tao ........................ H01B 1/127 427/299 |
| 2007/0089845 A1 | 4/2007 | Sotzing et al. |

(Continued)

FOREIGN PATENT DOCUMENTS

| | | |
|---|---|---|
| JP | 2008138300 A | 6/2008 |
| WO | 0057238 A1 | 9/2000 |

(Continued)

OTHER PUBLICATIONS

"All Organic Electrochromic Spandex", Department of Chemistry and the Polymer Program, University of Connecticut, Storrs, Connecticut, USA, pp. 296-300, including supplemental and supporting information; 2010 American Chemical Society; vol. 2, No. 1.
"Electrochemical Study of Dual Conjugated Polymer Electrochromic Devices", Journal of Electroanalytical Chemistry (2007), 609(2), 75-84.
"High Contrast Solid-State Electrochromic Devices from Substituted 3, 4-Propylenedioxythiophenes Using the Dual Conjugated Polymer Approach", Synthetic Metals (2007), 157(6-7), 261-268.
"Maximum Contrast from an Electrochromic Material", Electrochemistry Communications (2007), 9(8), 1931-1935.
"Optimization, Preparation, and Electrical Short Evaluation for 30 cm2 Active Area Dual Conjugated Polymer Electrochromic Windows", Organic Electronics (2007), 8(4), 367-381.
"Rapid Switching Solid State Electrochromic Devices Based on Complementary Conducting Polymer Films", Polymer Films (Weinheim, Germany) (1996), 8(10), 808-811.

(Continued)

*Primary Examiner* — Sheeba Ahmed
(74) *Attorney, Agent, or Firm* — Cantor Colburn LLP

(57) ABSTRACT

Electrically conductive synthetic fiber and fibrous substrate (e.g. synthetic leather) are disclosed. The electrically conductive polymeric fiber and polymeric fibrous substrate are made electrically conductive by the use of an electrically conductive polymer disposed on the fibers and in contact with inorganic desiccant particles located at the surface of the fibers. The new material finds utility as an electrode for devices and as a resistive heating element, and as a pathway to efficient thermoelectrics.

20 Claims, 4 Drawing Sheets

(56) References Cited

U.S. PATENT DOCUMENTS

| | | | |
|---|---|---|---|
| 2007/0100666 A1 | 5/2007 | Stivoric et al. |
| 2007/0215232 A1 | 9/2007 | Hassonjee et al. |
| 2007/0222909 A1 | 9/2007 | Slikkerveer et al. |
| 2008/0058633 A1 | 3/2008 | Boyden et al. |
| 2008/0170982 A1 | 7/2008 | Zhang et al. |
| 2008/0318002 A1 | 12/2008 | Burr et al. |
| 2009/0005748 A1 | 1/2009 | Ales et al. |
| 2010/0163283 A1 | 7/2010 | Hamedi et al. |
| 2010/0245971 A1 | 9/2010 | Sotzing et al. |
| 2010/0294335 A1 | 11/2010 | Huang et al. |
| 2011/0168951 A1 | 7/2011 | Sotzing |
| 2011/0304964 A1 | 12/2011 | Fleischer et al. |
| 2011/0315204 A1 | 12/2011 | Gleason et al. |
| 2011/0317240 A1 | 12/2011 | Sotzing et al. |
| 2012/0153236 A1 | 6/2012 | Cakmak et al. |
| 2012/0164429 A1 | 6/2012 | Shah et al. |
| 2012/0224247 A1 | 9/2012 | Sotzing et al. |
| 2012/0274616 A1 | 11/2012 | Scribner et al. |

FOREIGN PATENT DOCUMENTS

| | | |
|---|---|---|
| WO | 2006051380 A1 | 5/2006 |
| WO | 2006051384 A1 | 5/2006 |
| WO | 2007008977 A1 | 1/2007 |
| WO | 2007008978 A2 | 1/2007 |
| WO | 2008066458 A1 | 6/2008 |
| WO | 2008098136 A1 | 8/2008 |
| WO | 2009025849 A1 | 2/2009 |
| WO | 2010022353 A1 | 2/2010 |
| WO | 20100141743 A1 | 12/2010 |

OTHER PUBLICATIONS

"The Effects of Colored Base Fabric on Electrochromic Textile", University of Connecticut, Department of Chemistry and the Polymer Program, Storrs, Connecticut, USA, pp. 1-16, Jan. 4, 2010.

"Unique Variable-Gap Polyheterocycles for High-Contrast Dual Polymer Electrochromic Devices", Synthetic Metals (1997), 85(1-3), 1295-1298.

Adiprene Duracast E900, Chemtura Technical Information, Oct. 20, 2008, 4 pages.

ChemFiles, Enabling Technologies, Ionic Liquids, vol. 5 No. 6 (2005) 24 pages.

Duracure C3, Chemtura Technical Information, Sep. 8, 2008, 6 pages.

European Search Report for Application No. PCT/US2012023282 dated Jan. 5, 2015, 11 pages.

Fahad (2013) Thesis Ch. 6-7, pp. 129-182.

Fuest, Polyurethane Elastomers, Rubber Technology, 2001, 24 pages.

International Search Report for Application No. PCT/US2010/027956, mailed Jun. 7, 2010, 7 pages.

International Search Report for Application No. PCT/US2014/044529, International Filing date Jun. 27, 2014, mailed on Nov. 6, 2014, 5 pages.

International Search Report for International Application No. PCT/US2012/023282, International Application Filing Date Jan. 31, 2012, Date of Mailing Aug. 30, 2012, 3 pages.

Li et al., "Synthesis and characterization of mixing sof-segmented waterborne polyurethane polymer electrolyte with room temperature ionic liquid", Chinese Chemical Letters 20, 2009, pp. 519-522.

Lomax, "Breathable polyurethane membranes for textile and related industries", J. Mater. Chem. 17, 2007, pp. 2775-2784.

Materials Research Society, 2011 Spring Meeting, Online Abstract Feb. 1, 2011, 1 page.

Okuzaki, WIPO Publication No. WO2007099889A1_Abstract of published PCT Application No. PCT/JP2007/053467 filed on Feb. 26, 2007 and published on Sep. 7, 2007, 1 page.

Rowley et al., "New Electrochromic Materials", Science Progress (2002), 85 (3), 243-262.

Rymarczyk et al., "A novel ternary polymer electrolyte for LMP batteries based on thermal cross-linked poly (urethane acrylate) in presence of a lithium salt and an ionic liquid", European Polymer Journal 44, 2008, pp. 2153-2161.

Santhosh et al., "Preparation and properties of new cross-linked polyurethane acrylate elctrolytes for lithium batteries", Journal of Power Sources 160, 2006, pp. 609-620.

Seiko Epson Corp, JP2008179923, Abstract, Aug. 7, 2008, 2 pages.

Seok-Joo Wang (2012): Effect of Silica Nanoparticle Content on the Structure and Electrostatic Bonding of PEDOT: PSS, Molecular Crystals and Liquid Crystals, 568:1, 179-185.

Written Opinion for Application No. PCT/US2015/044529, International filing date Jun. 27, 2014, Mailing date Nov. 6, 2014, 7 pages.

Written Opinion for International Application No. PCT/US2012/023282, International Application Filing Date Jan. 31, 2012, Date of Mailing Aug. 30, 2012, 5 pages.

Written Opinion of International Search Report for PCT/US2010/027956, mailed Jun. 7, 2010, 7 pages.

Alemu et al., "Highly conductive PEDOT:PSS electrode by simple film treatment with methanol for ITO-free polymer solar cells." Energy Environ. Sci. 2012, 5, 9662.

Aleshin et al., "Electronic transport in doped poly (3,4-ethylenedioxythiophene) near the metal-insulator transition." Synth. Met. 90, 61-68 (1997).

Coating Guide Clevios TM P Formulations. 1-12 (2012) http://www.heraeus-clevios.com/media/webmedia_local/media/datenblaetter/Clevios_P_coating_guide_08-03-18jb2.pdf.

Crispin et al., "Conductivity, Morphology, Interfacial Chemistry, and Stability of Poly(3,4-ethylene dioxythiophene)-Poly (styrene sulfonate): A Photoelectron Spectroscopy Study", Journ. of Polym. Sci. Part B: Polymer Physics, vol. 41, No. 21, Nov. 11, 2003.

Ding et al. "Conductivity trends of PEDOT-PPS impregnated fabric and the effect of conductivity on electrochromic textile." ACS Applied Materials & Interfaces, 2010, vol. 2, No. 6, pp. 1588-1593.

Groenendaal, et al. Its Derivatives: Past , Present , and Future. Adv. Mater. 12, 481-494 (2000).

Hiremath et al.,"Simple setup to measure electrical properties of polymeric films." Mulimani, Rev. Sci. Instrum. 2006, 77, 126106.

Kim et al. "Highly conductive PEDOT:PSS nanofibrils induced by solution-processed crystallization." Adv. Mater. 26, 2268-72, 2109 (2014).

Laforgue, "Electrically controlled colour-changing textiles using the resistive heating properties of PEDOT nanofibers Laforgue," A. 2010 Journal of Materials Chemistry 20 (38) , pp. 8233-8235.

Lee (2013) Flexible graphene woven fabrics for touch sensing. Applied Physics Letters, 102 (16), 163117; 5 pages.

McCulloch, I. et al. "Liquid-crystalline semiconducting polymers with high charge-carrier mobility." Nat. Mater. 5, 328-33 (2006).

Mengistie, et al., Highly Conductive PEDOT:PSS Treated with Formic Acid for ITO-Free Polymer Solar Cells. ACS Appl. Mater. Interfaces 6, 2292-2299 (2014).

Molina, "Electrochemical characterization of reduced graphene oxide-coated polyester fabrics." Electrochimica Acta, (2013) 93, pp. 44-52.

Nardes et al., "A Morphological Model for the Solvent-Enhanced Conductivity of PEDOT:PSS Thin Films." Adv. Funct. Mater. 18, 865-871 (2008).

Negru (2012) Electrical conductivity of woven fabrics coated with carbon black particles. Fibers and Textiles. 20(1(90)), pp. 53-56.

Ouyang, J. et al. "On the mechanism of conductivity enhancement in poly(3,4-ethylenedioxythiophene):poly(styrene sulfonate) film through solvent treatment." Polymer (Guildf). 45, 8443-8450 (2004).

Reynolds, (1996) Controlled gap polymers for high contrast electrochromic devices. Polymeric Materials Science and Engineering, 75 pp. 414-415.

Shateri-Khalilabad (2013) Fabricating electroconductive cotton textiles using graphene. Carbohydrate polymers, 96(1), 190-5, 6 pages.

Suh et al., Effect of Fabric Substrate and Coating Material on the Quality of Conductive Printing, The Journal of the Textile Institute, 2013, vol. 104, No. 2, 213-222.

(56) References Cited

OTHER PUBLICATIONS

Voight et al., "Charge effects on the Formation of Multilayer conatining Strong Polyelectrolytes." J. Polym. Sci. Part B Polym. Phys. 2003, 41, 2561.
Wang et al., Effect of Silica Nanoparticle Content on the Structure and Electrostatic Bonding of PEDOT:PSS, Mol. Cryst. Liq. Cryst., vol. 568: pp. 179-185, 2012.
Woltornist et al.,"Preparation of conductive graphene/graphite infused fabrics using an interface trapping method" Carbon, vol. 81, 38-42 (2015) available online Sep. 19, 2014.
Xia et al., "PEDOT:PSS films with significantly enhanced conductivities induced by preferential solvation with cosolvents and their application in polymer photovoltaic cells." J. Mater. Chem. 21, 4927-4936 (2011).
Xia et al., "Significant Conductivity Enhancement of Conductive Poly(3,4-ethylenedioxythiophene): Poly(styrenesulfonate) Films through a Treatment with Organic Carboxylic Acids and Inorganic Acids." ACS Appl. Mater. Interfaces 2, 474-483 (2010).
Yamashita (2013) Fabrication and evaluation of a conductive polymer coated ealstomer contact structure for woven electronic textile. Sensors and Actuators A: Physical, 195, pp. 213-218.
European Search Report; European Patent Application No. 14820487.8; Date of Completion of the Search: Feb. 1, 2017; Date of Mailing: Feb. 13, 2017; 11 pages.

\* cited by examiner

ELECTRICALLY CONDUCTIVE SYNTHETIC FIBER AND FIBROUS SUBSTRATE, METHOD OF MAKING, AND USE THEREOF

CROSS REFERENCE TO RELATED APPLICATION

This application claims the benefit of U.S. Provisional Application No. 61/842,072 filed Jul. 2, 2013, which is hereby incorporated by reference in its entirety.

BACKGROUND

Intrinsically conducting polymers find wide application because of their conductive properties and ease of processing. Films prepared from intrinsically conducting polymers can be used as electrodes, and prepared into devices including electrochromic devices, and the like.

Besides films prepared on flat substrates, intrinsically conducting polymers can be applied to other substrates depending upon the industrial application. For example, conductive types of leather products have been produced using carbon black and the conductive polymer, polyaniline.

There remains a need in the art for new conductive polymeric material-based fibers and textiles.

BRIEF SUMMARY

In an embodiment is an electrically conductive synthetic leather comprising a synthetic leather comprising polymeric fibers comprising desiccant particles wherein a portion of the desiccant particles are located at the surface of the polymeric fibers; and an electrically conductive polymer film disposed on at least a portion of the polymeric fibers and at least in partial contact with the desiccant particles.

In another embodiment, an electrically conductive fibrous substrate comprising a fibrous substrate comprising polymeric fibers comprising desiccant particles wherein a portion of the desiccant particles are located at the surface of the polymeric fiber; and an electrically conductive polymer film disposed on at least a portion of the polymeric fibers of the fibrous substrate and at least in partial contact with the desiccant particles.

In another embodiment, an electrically conductive fiber comprising a polymeric fiber comprising desiccant particles wherein a portion of the desiccant particles are located at the surface of the polymeric fiber; and an electrically conductive polymer film disposed on at least a portion of the polymeric fiber and at least in partial contact with the desiccant particles.

In another embodiment, a method of making an electrically conductive synthetic leather comprises disposing an electrically conductive polymer onto a synthetic leather comprising polymeric fibers comprising desiccant particles wherein a portion of the desiccant particles are located at the surface of the polymeric fibers and the electrically conductive polymer is at least in partial contact with the desiccant particles.

In another embodiment, a method of making an electrically conductive fibrous substrate comprises disposing an electrically conductive polymer onto the fibrous substrate comprising polymeric fibers comprising desiccant particles wherein a portion of the desiccant particles are located at the surface of the fiber and the electrically conductive polymer is at least in partial contact with the desiccant particles.

In another embodiment, a method of making an electrically conductive fiber comprises disposing an electrically conductive polymer onto a polymeric fiber comprising desiccant particles wherein a portion of the desiccant particles are located at the surface of the fiber and the electrically conductive polymer is at least in partial contact with the desiccant particles.

DETAILED DESCRIPTION

Figure 1:
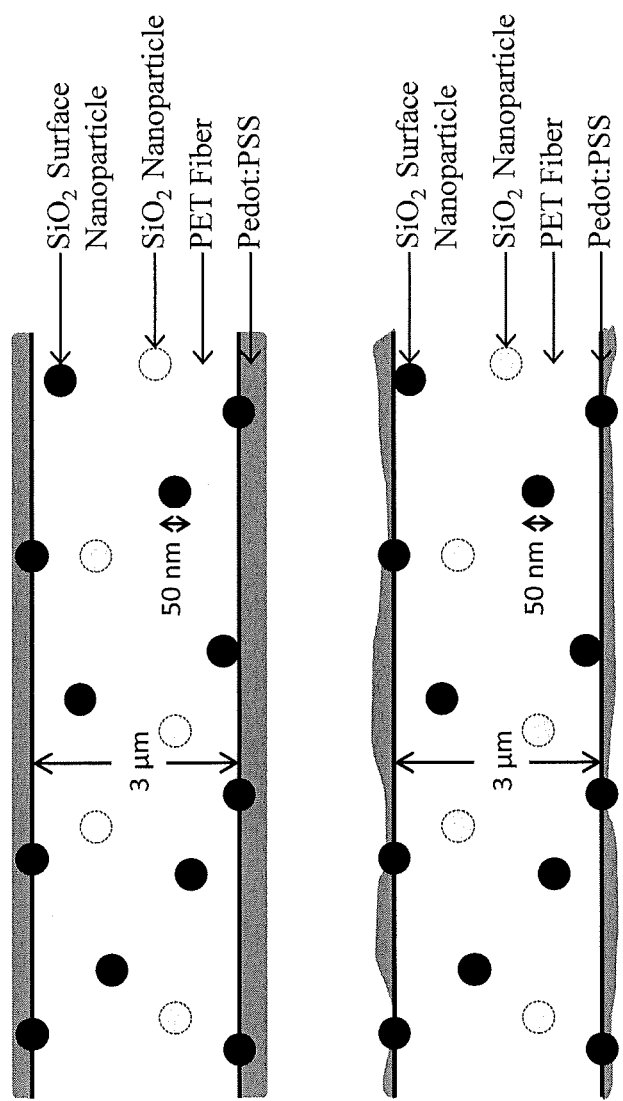
FIG. 1 is a schematic view of a synthetic leather PET fiber.

Disclosed herein are electrically conductive synthetic leather, electrically conductive polymeric fibrous substrate, and electrically conductive polymeric fiber, each comprising polymeric fiber which in turn comprises desiccant particles, wherein a portion of the desiccant particles are located at the surface of the polymeric fiber. The substrates are made electrically conductive by disposing an electrically conductive polymer onto the polymeric fiber where the electrically conductive polymer is at least in partial contact with the desiccant particles. Not wishing to be bound by theory, but it is believed there is an interaction between the electrically conductive polymer and the desiccant particles which allows the coated substrate to achieve sheet resistances ranging from 0.4 to 400 Ohms/square. For example, it has been found that electrically conductive synthetic leather does not require expensive metals such as silver to obtain very low sheet resistances (1.5 Ohms/square). Commercial silver fabric is able to obtain 1 Ohm/square sheet resistance but it is costly, being prepared from a precious metal.

In an embodiment, an electrically conductive synthetic leather prepared from poly(3,4-ethylenedioxythiophene)-polystyrenesulfonate results in a light blue coloration, as opposed to dark grey or black, as would result from silver or carbon black. As such, there are many options to obtain a larger color variety.

In an embodiment, the fibrous substrate is a non-woven fibrous substrate. In an embodiment, the fibrous substrate is a synthetic leather or a synthetic suede. In another embodiment, the fibrous substrate is woven.

In an embodiment is an electrically conductive synthetic leather comprising a synthetic leather comprising polymeric fibers comprising desiccant particles wherein a portion of the desiccant particles are located at the surface of the polymeric fibers; and an electrically conductive polymer film disposed on at least a portion of the polymeric fibers and at least in partial contact with the desiccant particles.

In another embodiment, an electrically conductive fibrous substrate comprises a fibrous substrate comprising polymeric fibers comprising desiccant particles wherein a portion of the desiccant particles are located at the surface of the polymeric fiber; and an electrically conductive polymer film disposed on at least a portion of the polymeric fibers of the fibrous substrate and at least in partial contact with the desiccant particles.

In another embodiment, an electrically conductive fiber comprises a polymeric fiber comprising desiccant particles wherein a portion of the desiccant particles are located at the surface of the polymeric fiber; and an electrically conductive polymer film disposed on at least a portion of the polymeric fiber and at least in partial contact with the desiccant particles.

In an embodiment, the electrically conductive synthetic leather or the electrically conductive fibrous substrate exhibits semiconductive behavior at low temperature (e.g. below 0° C.) and metallic behavior at high temperature (e.g. above 0° C.).

In an embodiment, the electrically conductive synthetic leather or the electrically conductive fibrous substrate exhibits sheet resistances ranging from 0.4 to 400 Ohms/square.

The electrically conductive synthetic leather, electrically conductive fibrous substrate, or electrically conductive fiber can be used as an electrode for devices (electrochromics and sensors), as a resistive heating element, and a pathway to efficient thermoelectrics. Specific uses include, for example, shoe and boots applications; heating elements, for example heated car seats and furniture, heated footwear and apparel, heated therapeutic pads, hotplates/ovens, heating tape, heating blankets, and the like; displays, electrochromic displays, and the like.

Exemplary electrically conductive polymers that can be used to prepare the electrically conductive synthetic leather, electrically conductive fibrous substrate, and electrically conductive fiber include poly(3,4-ethylenedioxythiophene) ("PEDOT") including poly(3,4-ethylenedioxythiophene): poly(styrenesulfonate) ("PEDOT:PSS") aqueous dispersion, a substituted poly(3,4-ethylenedioxythiophene), a poly(thiophene), a substituted poly(thiophene), a poly(pyrrole), a substituted poly(pyrrole), a poly(aniline), a substituted poly(aniline), a poly(acetylene), a poly(p-phenylenevinylene) (PPV), a poly(indole), a substituted poly(indole), a poly(carbazole), a substituted poly(carbazole), a poly(azepine), a (poly)thieno[3,4-b]thiophene, a substituted poly(thieno[3,4-b]thiophene), a poly(dithieno[3,4-b:3',4'-d]thiophene), a poly(thieno[3,4-b]furan), a substituted poly(thieno[3,4-b]furan), a derivative thereof, a combination thereof, and the like.

The electrically conductive polymer can be used in an amount of about 0.1 to about 10.0 wt % based on the weight of the substrate, specifically about 0.2 to about 8.0 wt %, more specifically about 0.3 to about 7.0 wt % and yet more specifically about 0.5 to about 5.0 wt %. In the fiber embodiment, the electrically conductive polymer can be used in an amount of about 0.1 to about 10.0 wt % based on the weight of the fiber, specifically about 0.2 to about 8.0 wt %, more specifically about 0.3 to about 7.0 wt % and yet more specifically about 0.5 to about 5.0 wt %.

The electrically conductive polymer film coating on the electrically conductive synthetic leather or the electrically conductive fibrous substrate can have an average thickness of 300 nm or less, specifically 250 nm or less, more specifically 100 nm or less, yet more specifically 30 nm or less, still yet more specifically 25 nm or less, and even more specifically 20 nm or less. The lower end of the thickness range can be about 4 nm or more.

Artificial leather can be made from any polymeric material such as nylon 6, nylon 66, nylon 610, nylon 12, co-polymerized nylon, polyethylene terephthalate, polytrimethylene terephthalate, SPANDEX (polyurethane-polyurea copolymer), polybutylene terephthalate, polypropylene terephthalate, polyurethane, polypropylene, polyethylene, polyester-based polyurethane copolymers thereof, or a combination thereof. The artificial leather can be finished (material having a glossy surface) or unfinished (material without a glossy surface). In an embodiment, a desiccant is used to prepare the artificial leather such that the fibers of the artificial leather comprise desiccant particles wherein a portion of the desiccant particles are located at the surface of the synthetic leather fibers.

The polymeric fiber and fibrous substrate can be made from any polymeric material such as nylon 6, nylon 66, nylon 610, nylon 12, co-polymerized nylon, polyethylene terephthalate, polytrimethylene terephthalate, SPANDEX (polyurethane-polyurea copolymer), polybutylene terephthalate, polypropylene terephthalate, polyurethane, polypropylene, polyethylene, polyester-based polyurethane, copolymers thereof, or a combination thereof. In an embodiment, a desiccant is used to prepare the fibrous substrate such that the fibers comprise desiccant particles wherein a portion of the desiccant particles are located at the surface of the fiber.

Exemplary desiccants include inorganic oxides such as silicon dioxide ($SiO_2$), titanium dioxide ($TiO_2$), aluminum oxide, calcium oxide, or a combination thereof. In a further embodiment, the desiccant is in particulate form having average particle size of about 1 nanometer (nm) to about 5 micrometer, specifically about 10 nm to about 500 nm, and more specifically about 25 nm to about 200 nm.

The electrically conductive substrate, including electrically conductive synthetic leather, is easily scalable to high volume manufacture. The electrically conductive polymer can be applied to the synthetic leather, fibrous substrate, or fiber using a variety of different techniques. For example drop casting, spray coating, ink jet coating, dip coating, gravure coating methods, and extrusion coating. Another approach is a soaking process. Many of these processes are easily adaptable to large scale manufacture.

These coating techniques generally comprise forming a mixture of the material to be coated with a solvent, applying the mixture to a surface of the synthetic leather substrate, and removing the solvent to form a thin film of the material adheringly disposed on the surface of the synthetic leather substrate. The solvent can be water, an organic solvent, or a combination of an organic solvent and water. Exemplary organic solvents include dimethyl sulfoxide (DMSO), dichloromethane (DCM), toluene, N,N-dimethyl formamide (DMF), propylene glycol monomethyl ether acetate (PGMEA), propylene glycol monomethyl ether (PGME), acetone, methanol, and ethanol.

The mixture can contain the electrically conductive polymer at a concentration of about 0.1 weight percent (wt. %) to about 5 wt. %, based on the total weight of the mixture, specifically about 0.2 to about 4 wt. %, more specifically 0.3 to about 4 wt. %, and still more specifically about 1.0 to about 3 wt. %.

In an embodiment, the artificial leather, polymeric fiber, and fibrous substrate can be plasma treated prior to the application of the electrically conductive polymer. Plasma or other surface modification treatment can be used to impart good wettability and adhesion of the electrically conductive polymer on the surface of artificial leather, polymeric fiber, and fibrous substrate. In an exemplary plasma treatment process, the use of atmospheric pressure plasma (helium, argon, air, oxygen, or a combination thereof) can be used. Other exemplary surface modification includes exposing the artificial leather, polymeric fiber, and fibrous substrate to organic solvents with similar solubility parameters as DMSO. Solvent treatment can be conducted alone or in addition to plasma treatment.

A method of making an electrically conductive synthetic leather, an electrically conductive fibrous substrate, or an electrically conductive fiber comprising disposing an electrically conductive polymer onto a synthetic leather comprising polymeric fibers comprising desiccant particles wherein a portion of the desiccant particles are located at the surface of the polymeric fibers, onto a fibrous substrate comprising polymeric fibers comprising desiccant particles wherein a portion of the desiccant particles are located at the surface of the polymeric fiber, or onto a polymeric fiber comprising desiccant particles wherein a portion of the desiccant particles are located at the surface of the polymeric fiber. In an embodiment, prior to the disposing step, the synthetic leather, the fibrous substrate, and the polymeric fiber are surface treated with a plasma treatment, a solvent treatment, or a combination thereof.

In an embodiment, PEDOT:PSS aqueous dispersion is loaded into unfinished and finished polyethylene terephthalate leather to yield highly conductive leather samples having sheet resistances ranging from 0.4 to 400 Ohms/square.

The term "fiber" as used herein includes single filament and multi-filament fibers, i.e., fibers spun, woven, knitted, crocheted, knotted, pressed, plied, or the like from multiple filaments. No particular restriction is placed on the length of the fiber, other than practical considerations based on manufacturing considerations and intended use. Similarly, no particular restriction is placed on the width (cross-sectional diameter) of the fibers, other than those based on manufacturing and use considerations. The width of the fiber can be essentially constant, or vary along its length. For many purposes, the fibers can have a largest cross-sectional diameter of 2 nanometers and larger, for example up to 2 centimeters, specifically from 5 nanometers to 1 centimeter.

In an embodiment, the fibers can have a largest cross-sectional diameter of 5 to 500 micrometers, more particularly, 5 to 200 micrometers, 5 to 100 micrometers, 10 to 100 micrometers, 20 to 80 micrometers, or 40 to 50 micrometers. In one embodiment, the conductive fiber has a largest circular diameter of 40 to 45 micrometers. Further, no restriction is placed on the cross-sectional shape of the fiber. For example, the fiber can have a cross-sectional shape of a circle, ellipse, square, rectangle, or irregular shape.

EXAMPLES

Example 1

Electrically Conductive Polyethylene Terephthalate Synthetic Leather—PEDOT:PSS, Comparison of Finished and Unfinished Synthetic Leather Samples of finished (material having a glossy surface) and unfinished (material without a glossy surface) polyethylene terephthalate (PET) synthetic leather were prepared into electrically conductive synthetic leather. Samples of the finished synthetic leather were cut to 1.5×1 inch swabs. Samples of the unfinished synthetic leather were cut to 2.0×1.5 inch swabs. The electrically conductive polymer used was Clevios™ PH1000 (Poly(3,4-ethylenedioxythiophene):poly(styrenesulfonate) aqueous dispersion (PEDOT:PSS, Clevios™ PH1000 commercially available from Heraeus as an aqueous dispersion, 1-1.3% solids content, PEDOT:PSS ratio by weight=~1:2.5, specific conductivity after addition of 5% dimethyl sulfoxide (DMSO) measured on the dried coating=850 S/cm) or Clevios™ P (Clevios™ P aqueous dispersion of PEDOT:PSS commercially available from Heraeus, 1.2-1.4% solids content). The application method was drop casting and 2 point resistances were measured (4 line measurements can also be used wherein current is measured between the outer leads, and voltage drop measured between the inner leads). Table 1 contains a summary of the samples, electrically conductive polymer used, method of applying the electrically conductive polymer, and the results of resistance measurements.

TABLE 1

| Sample, type | Electrically conductive polymer | Application method | Resistance measurement |
|---|---|---|---|
| 1-1 finished | Clevios ™ PH1000 | Drop cast, allowed to stand 10 minutes and then the sample was rinsed with water | >10 MOhm/square |
| 1-2 finished | Clevios ™ PH1000 | Drop cast ~1.5 ml, water removed by heating 70° C. for 10 minutes | 3 kOhm/square |
| 1-3 finished | Clevios ™ P | Drop cast ~1.5 ml, water removed by heating 70° C. for 10 minutes | 15 kOhm/square |
| 1-4 finished | Clevios ™ P | Flow coated to create a thickness gradient of electrically conductive polymer, water removed by heating 70° C. for 10 minutes | 40 kOhm/square = thickest region of coating, most conductive<br>1 MOhm/square = thin region of coating |
| 1-5 unfinished | Clevios ™ PH1000 | Drop casting ~2.0 ml wicked into sample, water removed by heating 70° C. for 1 hour | 4.5 kOhm/square (top side*)<br>8 kohm/square (bottom side**) |
| 1-6 unfinished | Clevios ™ PH1000 with 5 wt % DMSO | Drop casting ~2.0 ml wicked into sample, water removed by heating 70° C. for 1 hour | 45 Ohm/square (top side*)<br>100 Ohm/square (bottom side**) |

*top side is the side of the sample where the electrically conductive polymer was cast.
**bottom side is the opposite side of the sample where the electrically conductive polymer was cast.

Sample 1-1 was prepared to determine if the Clevios™ PH1000 absorbed into the finished leather. No wicking behavior of the electrically conductive polymer dispersion was observed for the finished synthetic leather samples. However, unoptimized resistances of 3 kOhm can be achieved with films cast atop the glossy surface of the finished synthetic leather samples. Using 5 wt % DMSO results in a resistance of 20 Ohms, two orders of magnitude better than films prepared without DMSO.

The unfinished samples showed wicking behavior through the thickness of the synthetic leather sample, with the top side containing a higher concentration of electrically conductive polymer compared to the bottom side. The electrically conductive polymer wicked the dispersion radially from the application point. The wicking behavior is likely due to the more porous nature of the unfinished synthetic leather compared to finished synthetic leather.

Using Clevios™ PH1000 with 5 wt % DMSO on the unfinished leather resulted in a phenomenal low resistance measurement of 45 Ohms/square. With further optimization resistance measurement as low as 0.4 Ohms/square have been achieved. It should be noted that good quality Indium doped tin oxide (ITO) coatings on polyethyleneterephthalate (PET) have 60 Ohms/square sheet resistance with the absolute best being at around 15 Ohms/square. ITO on glass has its best sheet resistance between 8 and 10 Ohms/square. Side by side comparisons with ITO on glass and ITO on plastic were conducted, in addition to electrical breakdown measurements on the ITO compared to the conductive leather showing that the conductive leather can handle higher current and power before breakdown. On the unoptimized samples, ITO coated PET-quality conductivity can be achieved with the unfinished synthetic leather. Color can be reduced by using less PEDOT:PSS absorbed in the leather and a lower resistance could be achieved through modification of the heat treatment.

Example 2

Electrically Conductive Polyethylene Terephthalate Synthetic Leather—PEDOT:PSS, Resistive Heating Additional samples of electrically conductive polyethylene terephthalate synthetic leather was prepared using 1 to 2.5% by weight Clevios™ PH1000 PEDOT:PSS aqueous dispersion containing 5% by weight DMSO. Heating the samples at 30 minutes yielded conductive synthetic leather with relatively higher sheet resistance (200 to 300 Ohms/square), whereas heating at 60, 90, and 120 minutes produced synthetic leather of approximately same sheet resistance that was lower than that of 30 minutes (60 to 100 Ohms/square).

Samples from above that were heated at 70 C for 60 minutes and then treated a second time with Clevios™ PH1000 and then dried at 70 C for 60 minutes dropped in sheet resistance from 60-100 Ohms/square to 10-20 Ohms/square.

Samples that were heated to 75° C. having the same weight percent of Clevios™ PH1000 in the synthetic leather had significantly lower resistances than those obtained at 70 C for the same heating time period. Generally, 60-100 Ohm/square at bake of 70 C for 60 minutes dropped to 4 to 5 Ohms/square for 75° C. for 60 minutes.

Heating at 75° C. for 30 minutes resulted in higher resistances (5 to 20 Ohms/sq) than those heated at the same temperature for 60 and 90 minutes (4 to 5 Ohms/sq).

A single drop was placed onto the unfinished synthetic leather. This drop wicked into the fabric and radially migrated approximately the same distance as the diameter of the drop. A study was performed in which 1 drop, then dried, was compared to two drops, to three drops, and to four drops. With each drop, the resistance decreases. After baking at 75° C. for 90 minutes, the 1 drop leather was 85, 2 drops was 32, 3 drops was 28, and four drops was 23 Ohms/sq, respectively. This experiment demonstrates that Clevios™ PH1000 has the ability to be delivered drop-by-demand to the fabric to produce conductive leather.

DMSO was compared at 5 wt % and 6 wt % in Clevios™ PH1000. The difference in resistance was minimal, with differences being approximately 0.1-0.3 Ohms/sq between samples with 5 wt % and those with 6 wt %.

Application of a vacuum of approximately 1 torr at 90° C. was found to increase the resistance of the samples in comparison to samples that were heated to 90° C. under ambient pressure. Sample baked under 1 ton pressure were between 3.5 to 3.9 Ohms/sq and those baked at same temperature under ambient pressure ranged from 2.4 to 2.8 Ohms/sq.

Samples baked at 90° C. and 100° C. were less resistive than samples baked at 75° C. or 70° C. Samples baked at 90° C. and 100° C. were approximately equivalent. Therefore, generally, as temperature for the bake increases up to 90° C., the resistance of the samples decreases. As the time for the bake increases up to 60 minutes, the resistance of the samples decrease. Beyond 60 minutes, no change was observed.

Demonstration of Application—electrically conductive synthetic leather as a conductive wire, and as a resistive heating element.

An electrically conductive synthetic leather, having 1.5 Ohms/square as measured by ohmmeter, was prepared with PEDOT:PSS as described above. When connections to the electrically conductive synthetic leather sample were made there was 4.5 Ohms of contact resistance (contact was made via thin copper wire stitched through the leather and silver paste at junction), this leather was able to support 8 V correlating to a current of 1.076 A of current flowing through the electrically conductive synthetic leather of approximately 2 inch length and 1 inch width. As a result of this high of a current flowing through the conductor, the temperature leveled at 151° C. It should be noted that the Tg of the synthetic leather is 152° C. Thus, it was possible to heat the leather resistively to its glass transition temperature.

The temperature was obtained at each different voltage and delta T was obtained as a function of the power (watts). The sample slowly degraded at 8V; however, was stable at 7V wherein 131° C. was achieved with a current of 0.997 A. This resistive heating leather could be used for numerous applications for temperatures ranging from room temperature to a delta T of 131° C.

One advantage to this electrically conductive leather is that the heat is evenly applied to the entire leather since the conductor is homogenously dispersed within the leather—as opposed to wire threaded in as the resistive heating element where local hotspots would develop.

As the electrically conductive synthetic leather material has a high electrical conductivity, and, in general, polymers have low thermal conductivity, this material would be ideal for thermoelectrics. The mechanical properties of the material are such that the electrically conductive synthetic leather could easily be rolled up, and then rolled out in the sun, where the heat of the sun would heat the leather and the heat then can be converted to a current. The top of the leather surface could be coated with carbon black or other carbonaceous material that would absorb most wavelengths of light and near infra red. Such a material could also be placed upon rooftops, etc.

Furthermore, a thermoelectric could be used for heat management. As an example, converting heat to electrical energy could be used to convert body heat to electricity, such as in sports shoes for example.

A sample of electrically conductive synthetic leather prepared from PEDOT:PSS was used to demonstrate the thermoelectric effect of the material. The sample was attached to the surface of a hotplate, and a weight was placed atop the sample to ensure contact to the hotplate. A thermocouple was placed between the sample and the hotplate. The hotplate was set to 80° C., and the reading on the thermocouple was 63.3° C., indicating that the temperature at the edge of the hotplate is cooler than that of the interior. The sample was then draped over an air gap (insulator) and attached to a lead block. The initial reading on the lead block was 21.5° C. Thus, with a temperature differential of 42° C., the multimeter set on Amps measured −1.1 microamps. The Seebeck coefficient for the material was calculated at several delta T's and ranges from 12.3 to 15.4 microvolts/K. Data was then obtained for the material at different temperatures and listed in Table 2 below:

TABLE 2

| Hotplate Temperature in C. | V (mV) | I (microA) | P (W) | Delta T | Seebeck (µV/K) |
|---|---|---|---|---|---|
| 22.3 | 0 | 0 | 0 | 0 | |
| 29 | −0.1 | −0.3 | 3E−11 | 7.5 | 13.33333 |
| 34.5 | −0.2 | −0.6 | 1.2E−10 | 13 | 15.38462 |
| 49.1 | −0.35 | −0.75 | 2.63E−10 | 27.6 | 12.68116 |
| 62.3 | −0.5 | −1.1 | 5.5E−10 | 40.8 | 12.2549 |
| 62.8 | −0.6 | −1.1 | 6.6E−10 | 41.3 | 14.52785 |
| 85 | −0.8 | −1.6 | 1.28E−09 | 63.5 | 12.59843 |

Example 3

Electrically Conductive Polyethylene Terephthalate Synthetic Leather—PEDOT:PSS Percolation 110° C.

PEDOT:PSS aqueous dispersion Clevios™ PH1000 was applied in various concentrations to synthetic leather (polyethylene terephthalate-based), the fibers of which contain $SiO_2$ nanoparticles (~50 nanometers) embedded within and on the surface of the fibers. Sample preparation involved soaking the synthetic leather (PET) once and dried once. DMSO (5 wt %) in Clevios™ PH1000 was drop-coated onto all samples, with dilutions of the PEDOT:PSS to get values below 2% by weight. Resistance (Ohm) was measured using a sample holder with fixed silver probes ¾ inches apart and the results are provided in Table 3.

TABLE 3

| Sample | % weight of DMSO and PEDOT:PSS | Resistance (Ω) |
|---|---|---|
| 1 | 0.5 | 216 |
| 2 | 0.98 | 44.3 |
| 3 | 1.25 | 22.4 |
| 4 | 1.97 | 16 |
| 5 | 2.87 | 14.2 |

A generalized schematic of a PET fiber of the synthetic leather is shown in FIG. 1 where there are nanoparticles of $SiO_2$ embedded in the fiber (dotted circles) and located at the surface of the fiber (dark circles). The $SiO_2$ nanoparticles located at the surface of the fiber are in contact with the PEDOT:PSS coating.

Example 4

Electrically Conductive Synthetic Leather—PEDOT

Figure 2:
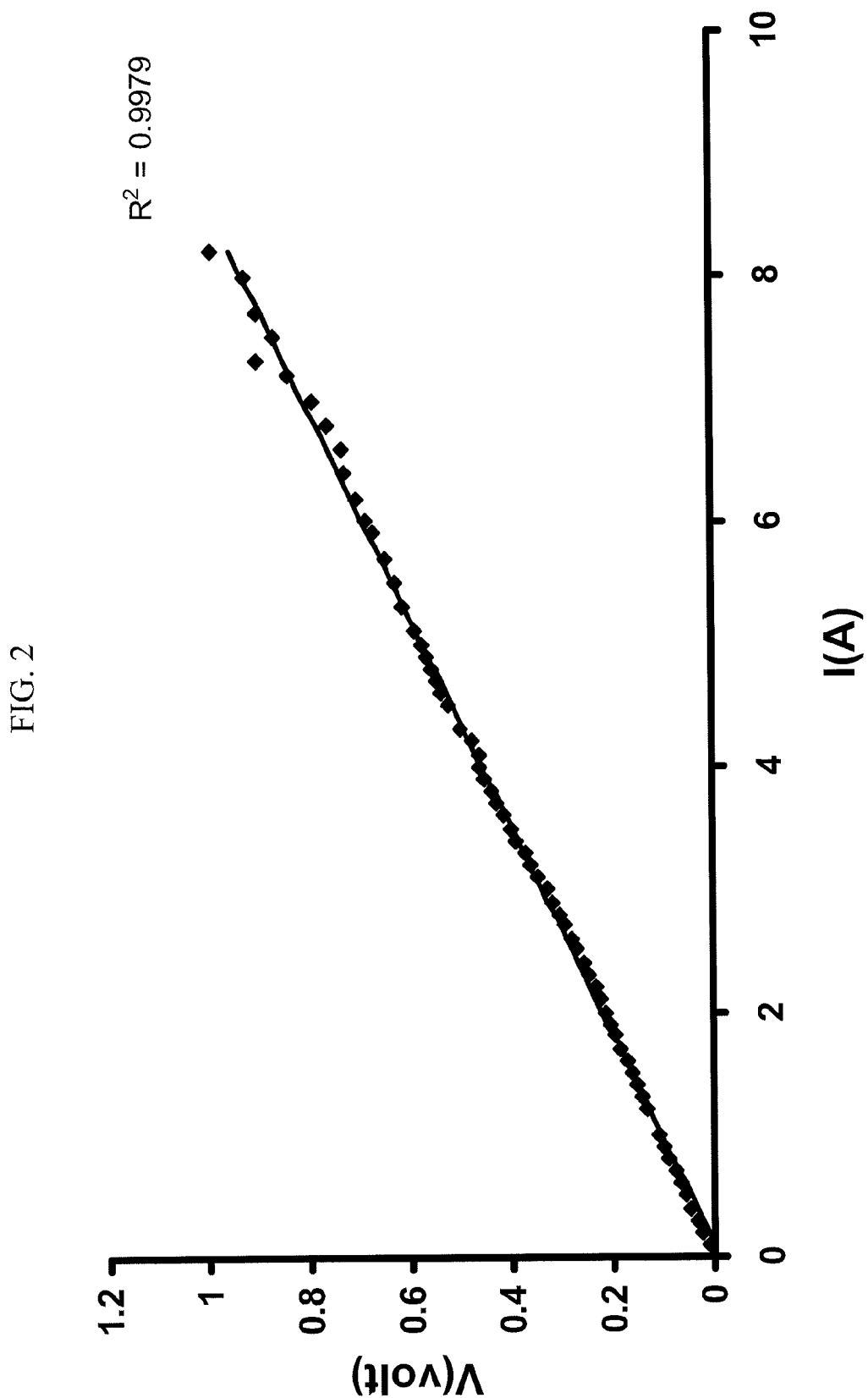
FIG. 2 illustrates the ohmic behavior of an electrically conductive synthetic leather.

PEDOT:PSS was applied to synthetic leather (polyethylene terephthalate-based) which comprises nanoparticles of $SiO_2$. The sample was capable of passing 8 amps of current. The ohmic behavior of the sample is shown in FIG. 2 which is a plot of the current in ampere (I (A)) versus voltage (V) in volts. The $R^2$=0.9979 and the resistance=0.117Ω.

Figure 3:
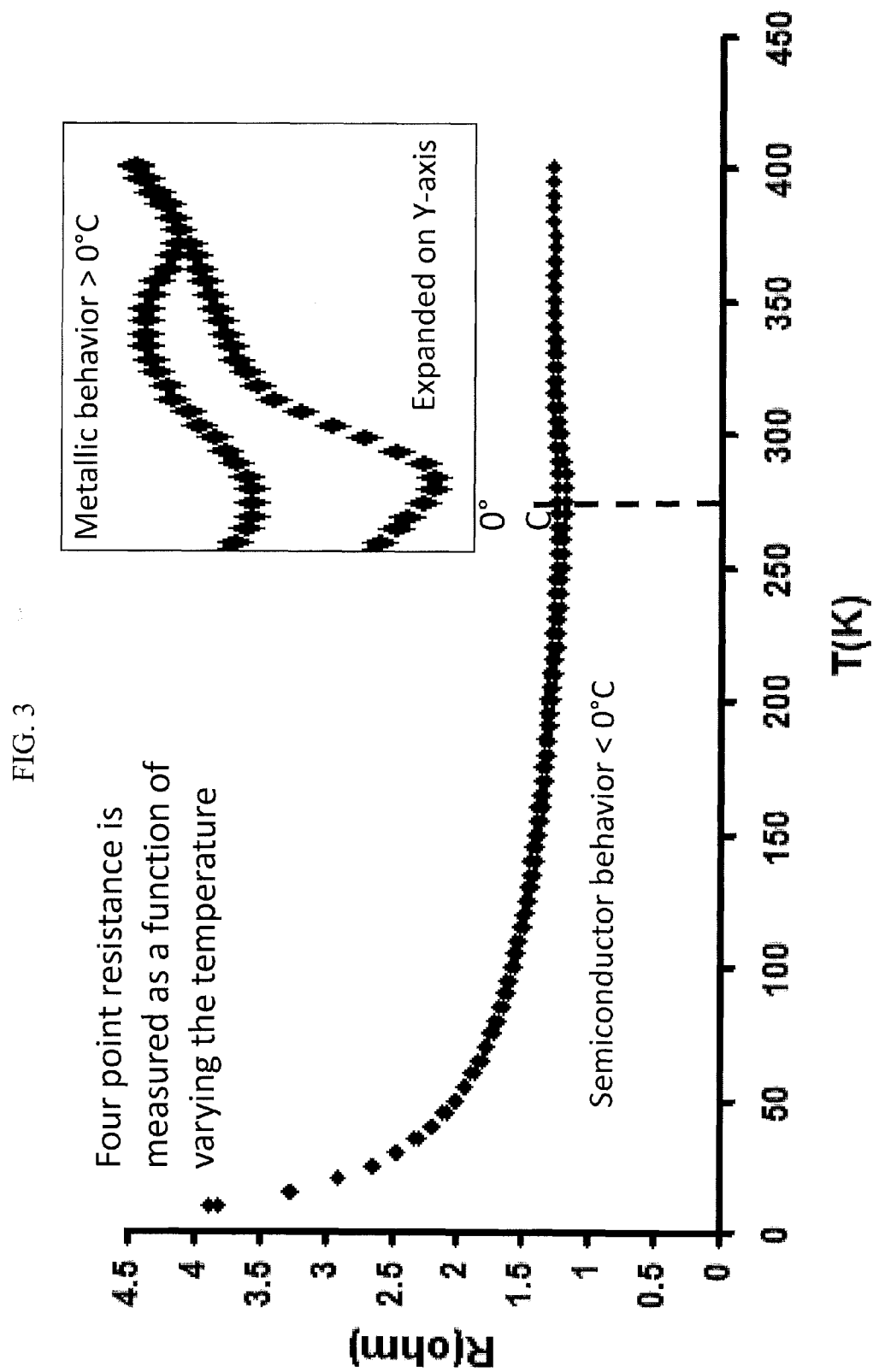
FIG. 3 illustrates the temperature dependent behavior of an electrically conductive synthetic leather: semiconductive below 0° C. and metallic above 0° C.

The sample further shows temperature dependent behavior. Four point resistance is measured as a function of varying the temperature and plotted as Temperature in Kelvin (T(K)) versus Resistance (R(Ohm)) in FIG. 3. As shown in the graph, the sample exhibited semiconductor behavior at temperatures less than 0° C. (273.15 K). However, unexpectedly, the material exhibits metallic behavior at temperatures above 0° C. (273.15 K) as shown in the expanded plot insert in FIG. 3.

Example 5

Figure 4:
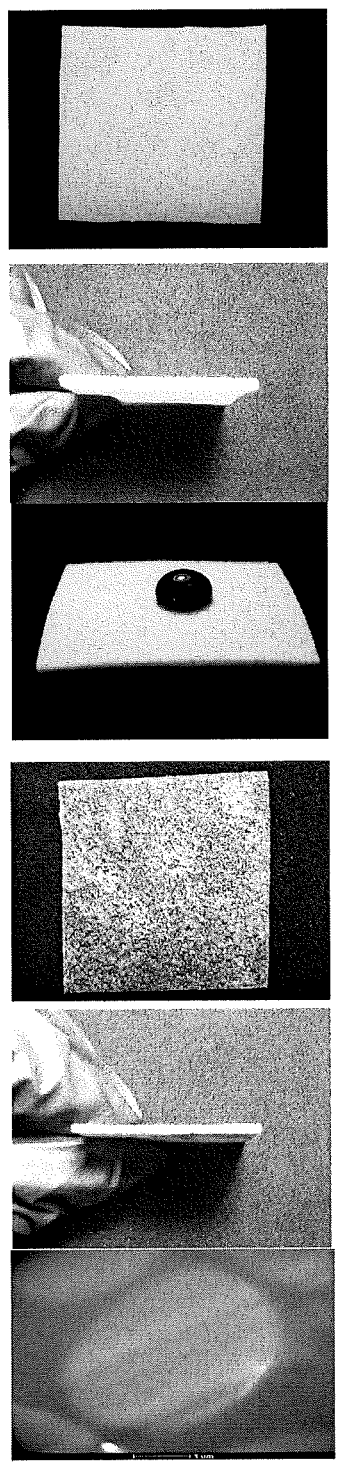
FIG. 4 illustrates the difference between synthetic leather with and without desiccant particles and PEDOT coated substrates prepared therefrom.
Figure 4:
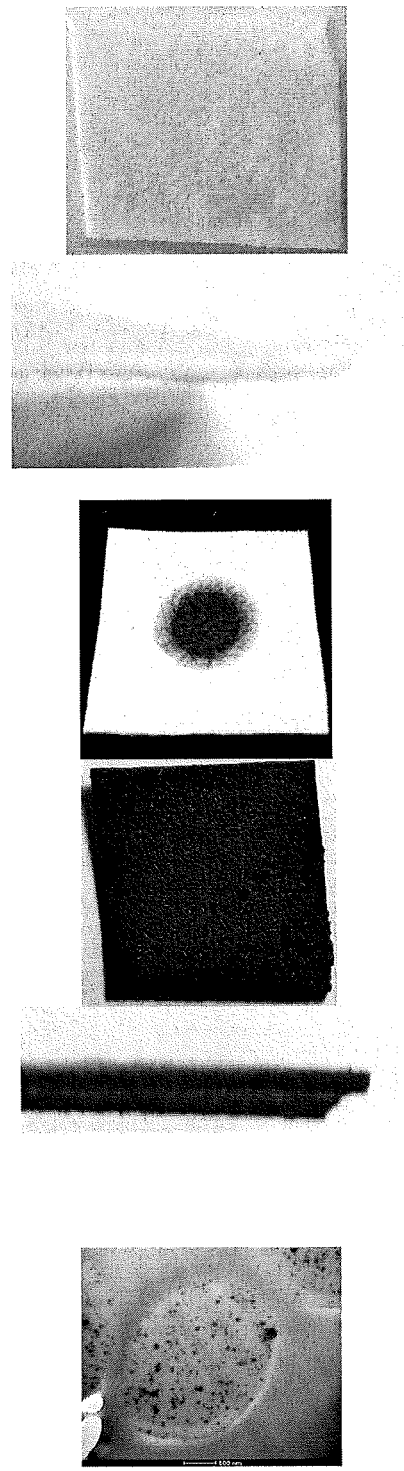

Comparison Between Synthetic Leather Substrates, with and without $SiO_2$ Desiccant Particles FIG. 4 includes a series of images illustrating the differences between electrically conductive synthetic leather prepared from synthetic leather free of desiccant particles (Column A) and synthetic leather containing desiccant particles (Column B).

Column A: White nonwoven PET unfinished synthetic leather without desiccant nanoparticles.

Column B: Grey nonwoven PET unfinished synthetic leather with $SiO_2$ nanoparticles having an average diameter of 100 nm with a range in diameter size from a lower limit of 50 and upper limit of 150 nm.

A1: Top surface view of leather without nanoparticles, 1 inch×2 inch sample size.

A2: Side view of leather without nanoparticles, thickness 0.8 mm.

A3: 5 wt. % DMSO doped PEDOT:PSS droplet on top surface of leather without nanoparticles.

A4: Clevios™ PH1000 was doped with 5% by weight DMSO. The solution does not wick into the PET leather without nanoparticles, therefore the sample was soaked for 15 minutes. The leather was dried at 110° C. for one hour and the weight percent of doped PEDOT:PSS remaining on the dried white PET is 6.8%. The resistance on the top surface as measured by two point probe at ¾" ranged from 20-40 Ohms. The resistance on the bottom ranged from 30-50 Ohms.

A5: Side view of white PET leather not containing nanoparticles with PEDOT-PSS, after annealing at 110° C.

A6: Transmission electron microscopy ("TEM") image of PET leather not containing nanoparticles, without PEDOT:PSS.

B1: Top surface view, 1 inch×2 inch sample size. White nonwoven PET unfinished synthetic leather with $SiO_2$ nanoparticles.

B2: Side view of white nonwoven PET unfinished synthetic leather with nanoparticles, thickness 0.6 mm.

B3: 5 wt % DMSO doped PEDOT:PSS droplet on top surface of white unfinished synthetic PET leather containing nanoparticles.

B4: Top view of unfinished PET 5.7 wt % PEDOT:PSS leather and annealing temperature 110° C. for 1 hour; R=0.548 Ohm/sq and maximum current 3.2 A before breakdown.

B5: Side view of PEDOT-PSS treated white PET containing $SiO_2$ nanoparticles, thickness 0.8 mm.

B6: TEM image of untreated PET leather containing $SiO_2$ nanoparticles without PEDOT:PSS; the nanoparticles are clearly visible in the image.

Example 6

Electrically Conductive Polyethylene Terephthalate Synthetic Leather—PEDOT:PSS, Resistive Heating A PET leather fabric having a highest melt transition at about 57° C. by differential scanning calorimetry was prepared into an electrically conductive polyethylene terephthalate synthetic leather using 6.51 weight percent loading of PEDOT:PSS. The leather fabric was connected to a power source using copper wire and silver paste. The temperature change over time was measured after application of a voltage (Thermocouple: 5V, 1.15 A (2.2 ohm/square sheet resistance). At time=600 seconds, the power was shut off and the sample allowed to cool. The results of the study are provided in Table 4.

TABLE 4

| Time | Temperature |
|---|---|
| 0 | 22.8 |
| 30 | 139 |
| 60 | 184 |
| 90 | 195 |
| 120 | 201 |
| 150 | 200 |
| 180 | 200 |
| 210 | 200 |
| 240 | 200 |
| 270 | 203 |
| 300 | 201 |
| 330 | 203 |
| 360 | 201 |
| 420 | 201 |
| 480 | 206 |
| 540 | 202 |
| 600 | 207 |
| 630 | 120 |
| 660 | 56 |
| 690 | 34 |
| 720 | 23 |

As shown by the data in Table 4, at 5 volts, a temperature of 200 ° C. (Delta T of approximately 180° C.) is achieved in 100 seconds. The fabric can achieve 60° C. in approximately 20 seconds or less. The cool down temperature is on the same time scale.

It is noted that holding the sample at 200° C. for approximately 450 seconds resulted in no degradation in conductivity.

Another sample was prepared with the same synthetic PET leather fabric starting material and using a 3.18 weight percent PEDOT-PSS loading to achieve a sheet resistance of 3.9 ohm/square. The results of the resistive heating study for various applied voltages are provided in Table 5.

TABLE 5

| Time | Temperature 2 Volt | Temperature 4 Volt | Temperature 5 Volt | Temperature 7 Volt |
|---|---|---|---|---|
| 0 | 18.8 | 18.9 | 19.6 | 19.6 |
| 30 | 21.7 | 29.9 | 37.3 | 58.8 |
| 60 | 22.8 | 35.7 | 46.5 | 74.4 |
| 90 | 23.2 | 38 | 51.1 | 82.2 |
| 120 | 23.4 | 39 | 52 | 86.5 |
| 150 | 23.4 | 39.6 | 52.2 | 87 |
| 180 | — | 40 | 53.7 | 86.8 |
| 210 | — | 40.6 | 54 | 87 |
| 240 | — | 40.4 | 53.8 | 88.5 |
| 270 | — | 40.8 | 54.5 | 87.7 |

The lower the sheet resistance, the higher the delta T that can be achieved and therefore better resistive heating. As shown, at approximately 7 watts, the 3.9 ohm/square sample achieves a 70° C. delta T; whereas at 6.6 watts, the 2.2 ohm/square sample achieves a 180° C. delta T. This demonstrates a 2.5× improvement.

Example 7

Electrically Conductive Polyethylene Terephthalate Electrospun Nanofiber Mat with and without Silica Polyethylene terephalate (PET) electrospun fibers and PET/silica electrospun fibers were individually prepared as free standing mats having densities of about 0.1 g/ml. PET/silica solution was prepared by dissolving PET solution in 50:50 trifluoroacetic acid:dichloromethane. Hydrophilic fumed silica is added and the resulting mixture is shear mixed for 15 minutes to result in a 20 weight PET+3 weight silica solution. Electro-spinning of the solution was conducted at a flow rate of 3 milliliters (ml)/hour, applied potential: 15 kV, collector plate distance: 15 cm, and run time: 4 or 8 hours to form a fiber mat.

PET mats without silica were also prepared using the same process.

After electrospinning, the fiber mats were dried at 75° C. in a drying oven for 30 minutes. The dried fiber mats were then plasma treated to provide good wettability and adhesion of PEDOT-PSS on the surface of the PET or PET/silica fiber mat. Plasma etching was performed using a Fischione instruments model 1020 plasma cleaner with a 13.56 MHz oscillating field system. Operating parameters were as follows; pull vacuum for 2-3 minutes (once instrument indicates a ready-state) while flowing 25%/75% oxygen:argon, apply plasma for 5 seconds.

The mats were infused with PEDOT-PSS+5 wt % DMSO by using either a drop casting method ("drop cast method") or by completely submersing the mat in diluted PEDOT-PSS+5 wt % DMSO solution (PEDOT-PSS: 1 gram, Water: 4 grams, DMSO: 50 milligrams) ("soaking method"). After 30 minutes the mats were removed from the PEDOT-PSS+5 wt % DMSO mixture and allowed to air dry for 30 minutes. The mats were then annealed for 1 hour at 110° C. in air.

Conductivity measurements of the sheets were conducted using a four-line silver paint contact to measure voltage as a function of current. A minimum of 10 voltage/current data points were taken to plot I-V at room temperature. Sheet resistance was calculated based on the slope of the curve- (Keithley224 Programmable was used as power source). Resistivity was calculated based on film thickness measurements done by scanning electron microscopy (SEM). The results are provided in Table 6.

TABLE 6

| Formulation | Run time | PEDOT-PSS loading (% wt) | Rs (ohms/square) |
|---|---|---|---|
| 20 wt PET with silica; drop cast PEDOT-PSS | 8 hours | 3.46 | 4 |
| 20 wt PET without silica; drop cast PEDOT-PSS | 4 hours | 2.79 | 20 |
| 20 wt PET with silica; drop cast PEDOT-PSS | 4 hours | 3.75 | — |
| 20 wt PET with 3 wt silica; PEDOT-PSS soaking method | 8 hours | 2.16 | 4.88 (average) |

The singular forms "a," "an," and "the" include plural referents unless the context clearly dictates otherwise. The endpoints of all ranges directed to the same characteristic or component are independently combinable and inclusive of the recited endpoint.

While the invention has been described in detail in connection with only a limited number of embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that aspects of the invention can include only some of the described embodiments. Accordingly, the invention is not to be seen as limited by the foregoing description, but is only limited by the scope of the appended claims.

What is claimed is:

1. An electrically conductive fibrous substrate, comprising:
   a fibrous substrate comprising polymeric fibers comprising desiccant particles wherein a portion of the desiccant particles are located at the surface of the polymeric fiber; and
   an electrically conductive polymer film disposed on at least a portion of the polymeric fibers of the fibrous substrate and at least in partial contact with the desiccant particles.

2. An electrically conductive fiber, comprising:
   a polymeric fiber comprising desiccant particles wherein a portion of the desiccant particles are located at the surface of the polymeric fiber; and
   an electrically conductive polymer film disposed on at least a portion of the polymeric fiber and at least in partial contact with the desiccant particles.

3. The electrically conductive fibrous substrate of claim 1, wherein the electrically conductive fibrous substrate is an electrically conductive synthetic leather.

4. The electrically conductive fibrous substrate of claim 1, wherein the desiccant particles are $SiO_2$, $TiO_2$, aluminum oxide, calcium oxide, or a combination thereof.

5. The electrically conductive fiber of claim 2, wherein the desiccant particles are $SiO_2$, $TiO_2$, aluminum oxide, calcium oxide, or a combination thereof.

6. The electrically conductive fibrous substrate of claim 1, wherein the desiccant particles have a particle size of about 1 nanometer to about 5 micrometers.

7. The electrically conductive fiber of claim 2, wherein the desiccant particles have a particle size of about 1 nanometer to about 5 micrometers.

8. The electrically conductive fibrous substrate of claim 1, wherein the electrically conductive polymer is PEDOT:PSS, a poly(3,4-ethylenedioxythiophene), a substituted poly(3,4-ethylenedioxythiophene), poly(thiophene), a substituted poly(thiophene), poly(pyrrole), a substituted poly(pyrrole), poly(aniline), a substituted poly(aniline), poly(acetylene), poly(p-phenylenevinylene) (PPV), a poly(indole), a substituted poly(indole), a poly(carbazole), a substituted poly(carbazole), a poly(azepine), a (poly)thieno[3,4-b]thiophene, a substituted poly(thieno[3,4-b]thiophene), a poly(dithieno[3,4-b:3',4'-d]thiophene), a poly(thieno[3,4-b]furan), a substituted poly(thieno[3,4-b]furan), a derivative thereof.

9. The electrically conductive fiber of claim 2, wherein the electrically conductive polymer is PEDOT:PSS, a poly(3,4-ethylenedioxythiophene), a substituted poly(3,4-ethylenedioxythiophene), poly(thiophene), a substituted poly(thiophene), poly(pyrrole), a substituted poly(pyrrole), poly(aniline), a substituted poly(aniline), poly(acetylene), poly(p-phenylenevinylene) (PPV), a poly(indole), a substituted poly(indole), a poly(carbazole), a substituted poly(carbazole), a poly(azepine), a (poly)thieno[3,4-b]thiophene, a substituted poly(thieno[3,4-b]thiophene), a poly(dithieno[3,4-b:3',4'-d]thiophene), a poly(thieno[3,4-b]furan), a substituted poly(thieno[3,4-b]furan), a derivative thereof.

10. The electrically conductive fibrous substrate of claim 1, wherein the electrically conductive polymer is PEDOT:PSS present in an amount of about 0.1 to about 10.0 wt % based on the weight of the substrate.

11. The electrically conductive fibrous substrate of claim 1, wherein the electrically conductive polymer film coating has an average thickness of 250 nm or less.

12. The electrically conductive fiber of claim 1, wherein the electrically conductive polymer film coating has an average thickness of 300 nm or less.

13. The electrically conductive fibrous substrate of claim 1, wherein the polymeric fiber is nylon 6, nylon 66, nylon 610, nylon 12, co-polymerized nylon, polyethylene terephthalate, polytrimethylene terephthalate, polybutylene terephthalate, polypropylene terephthalate, polyurethane, polypropylene, polyethylene, polyurethane-polyurea copolymer, polyester-based polyurethane, copolymers thereof, or a combination thereof.

14. The electrically conductive fiber of claim 2, wherein the polymeric fiber is nylon 6, nylon 66, nylon 12, co-polymerized nylon, polyethylene terephthalate, polybutylene terephthalate, polypropylene terephthalate, polyurethane, polypropylene, polyethylene, polyurethane-polyurea copolymer, copolymers thereof, or a combination thereof.

15. The electrically conductive fibrous substrate of claim 1, which exhibits sheet resistances ranging from 0.4 to 400 ohms/square.

16. The electrically conductive fibrous substrate of claim 1, which exhibits metallic behavior at temperatures above 0° C.

17. The electrically conductive fibrous substrate of claim 1, used as an electrode, a resistive heating element, or thermoelectric.

18. The electrically conductive fiber of claim 1, used as an electrode, a resistive heating element, or thermoelectric.

19. A method of making the electrically conductive fibrous substrate of claim 1, comprising disposing an electrically conductive polymer onto the fibrous substrate;
   optionally surface treating the fibrous substrate prior to the disposing step, wherein the surface treating is a plasma treatment, a solvent treatment, or a combination thereof.

20. The method of claim 19, wherein the electrically conductive polymer is drop cast, spray coated, ink jet coated, dip coated, spin coated, gravure coated, extrusion coated onto the fibrous substrate, or the fibrous substrate is soaked in a mixture of electrically conductive polymer and solvent.

\* \* \* \* \*